(12) United States Patent
You et al.

(10) Patent No.: US 7,642,483 B2
(45) Date of Patent: Jan. 5, 2010

(54) GLASS-PLATE CUTTING MACHINE

(75) Inventors: Ki-Yong You, Kyunggi-do (KR);
Choon-Taek Kim, Kyunggi-do (KR);
Min-Young An, Jeonrabuk-do (KR);
Mi-Jee Kim, Kyunggi-do (KR)

(73) Assignee: Rorze Systems Corporation, Kyunngi-do (KR)

( * ) Notice: Subject to any disclaimer, the term of this patent is extended or adjusted under 35 U.S.C. 154(b) by 341 days.

(21) Appl. No.: 10/541,198

(22) PCT Filed: Dec. 18, 2003

(86) PCT No.: PCT/KR03/02775
§ 371 (c)(1), (2), (4) Date: Jul. 5, 2005

(87) PCT Pub. No.: WO2004/060823
PCT Pub. Date: Jul. 22, 2004

(65) Prior Publication Data
US 2006/0151450 A1      Jul. 13, 2006

(30) Foreign Application Priority Data
Jan. 6, 2003 (KR) ............... 10-2003-0000645

(51) Int. Cl.
*B23K 26/14* (2006.01)
*B23K 26/42* (2006.01)
*C03B 33/09* (2006.01)

(52) U.S. Cl. ............... 219/121.68; 219/121.76; 219/121.84; 225/93.5; 225/94; 225/96; 65/105

(58) Field of Classification Search ...............
219/121.67–121.69, 121.72, 121.76, 121.83, 219/121.84; 225/2, 3, 93.5, 94, 96; 65/105, 65/112, 174, 175; 216/94
See application file for complete search history.

(56) References Cited

U.S. PATENT DOCUMENTS

| | | | |
|---|---|---|---|
| 3,932,826 A | | 1/1976 | Read, Jr. |
| 5,435,724 A | * | 7/1995 | Goodman et al. ............ 433/215 |
| 5,567,484 A | * | 10/1996 | Baumgart et al. ........... 427/555 |
| 5,609,284 A | | 3/1997 | Kondratenko |
| 5,978,189 A | * | 11/1999 | Habu .......................... 360/135 |
| 6,112,967 A | | 9/2000 | Ostendarp et al. |
| 6,211,488 B1 | | 4/2001 | Hoekstra et al. |
| 6,252,197 B1 | | 6/2001 | Hoekstra et al. |
| 6,402,004 B1 | * | 6/2002 | Yoshikuni et al. ............... 225/2 |
| 6,423,930 B1 | * | 7/2002 | Matsumoto ............ 219/121.69 |

(Continued)

FOREIGN PATENT DOCUMENTS

KR   10-2002-0009070   2/2002

(Continued)

OTHER PUBLICATIONS

R.M. Lumley, "Controlled Separation of Brittle Materials Using a Laser," Ceramic Bulletin, vol. 48, No. 9, 1969, pp. 850-854.

*Primary Examiner*—Samuel M Heinrich
(74) *Attorney, Agent, or Firm*—Baker & Hostetler LLP

(57) ABSTRACT

A glass plate cutting machine using a laser beam is provided to solve problems, such as uneven glass section and slanting cutting. By using the glass plate cutting machine of the current invention, the glass plate is irradiated with a first carbon dioxide laser beam of 0.05-2 joule/mm2 on a long oval shaped area of 20-200 mm2 according to an expected cutting line thereof, and immediately cooled with water, to generate a scribe line, which is then further irradiated with a second carbon dioxide laser beam of 0.1-0.5 joule/mm' on the area of 20-200 mm2 thus obtaining a superior glass section.

7 Claims, 2 Drawing Sheets

U.S. PATENT DOCUMENTS

| | | | |
|---|---|---|---|
| 6,489,588 B1* | 12/2002 | Hoekstra et al. | 219/121.67 |
| 6,723,952 B2* | 4/2004 | Choo et al. | 219/121.72 |
| 6,744,009 B1* | 6/2004 | Xuan et al. | 219/121.67 |
| 6,850,812 B2* | 2/2005 | Dinauer et al. | 700/166 |
| 2003/0052098 A1* | 3/2003 | Kim et al. | 219/121.68 |
| 2004/0036975 A1* | 2/2004 | Slatkine | 359/584 |
| 2006/0021978 A1* | 2/2006 | Alexeev et al. | 219/121.72 |
| 2006/0101858 A1* | 5/2006 | Fujii | 65/29.18 |

FOREIGN PATENT DOCUMENTS

KR 100393890 7/2003

* cited by examiner

GLASS-PLATE CUTTING MACHINE

TECHNICAL FIELD

The present invention relates to a machine for cutting a glass plate with a laser beam in fabrication of a display panel using liquid crystal, plasma and field emission, and a display panel fabricated by using the cutting machine.

BACKGROUND ART

Conventionally, a cutting method of a glass plate consists mainly of scribing the glass plate by means of an ultra-hard material, such as diamond, to generate a scribe line of the glass plate, which is then subjected to a breaking process under mechanical stress.

Since Lumley has firstly reported a method of cutting a glass plate with a laser beam in Ceramic Bulletin, Vol. 48, No. 9, 1969, much research therefor has been performed and filed. According to the studies of Lumley, a glass material is not cut by heating, but cut by generating shallow cracks (hereinafter, referred to as 'scribe line') overheated and expanded by a laser beam and propagating them. Then, U.S. Pat. No. 3,932,726 discloses a method of severing a glass plate having an unlimited length to plates having a predetermined length. In U.S. Pat. No. 6,112,967, there is disclosed a method of generating a shallow scribe line by irradiating a laser beam in a "U" shape on a target material and then cooling the target material. Further, U.S. Pat. No. 5,609,284 discloses a method of generating a deep scribe line by pre-heating a glass plate.

Before the laser beam irradiation for generation of the scribe line, a micro-crack is mechanically formed in a glass plate and then propagated (U.S. Pat. No. 6,252,197), or a crack is formed in a substrate by use of a pulse laser beam (U.S. Pat. No. 6,211,488).

Recently, there are proposed methods of cutting a single-crystal silicon wafer, as a semiconductor material, by use of a laser.

However, the above laser beam cutting method, characterized in that the scribing process to generate the scribe line uses the laser beam and the breaking process employs a mechanical stress, is disadvantageous in terms of low reliability, and additional requirement of a polishing process due to the breaking process by the mechanical stress.

To solve the above problems, a laser cutting method of a non-metallic material, such as a glass plate, is disclosed (Korean Patent Application No. 10-2000-0042313), which includes forming initial cracks in a desired direction at a cutting initiation point of the non-metallic material, irradiating a first heating beam along the cutting line to heat the non-metallic material, firstly quenching the heated portion by the first beam to generate cracks, irradiating a second heating beam to the cracks to heat the non-metallic material, and secondly quenching the heated portion by the second heating beam.

That is, the above method is characterized in that not only the generation of the initial cracks and the scribing process, but also the breaking process, are performed by use of the laser beam. Thereby, a cutting efficiency of the glass plate can increase up to 95% or more.

However, cracks having irregular sizes and shapes, referred to as hackle marks at a section of the cutting initiation portion of the glass plate, constitutes 10% of the entire cut portions, and thus the glass plate has drastically uneven surfaces on the section thereof, which negatively affects the quality of the end product.

Although the hackle marks are shown upon the initial cutting of the glass plate, the cut section becomes smooth after the initial cutting. Thereby, a rectilinear-cutting characteristic of the glass plate decreases at the cutting initiation portion thereof, and thus complete separation of the plate is not achieved.

Further, evenness of the cut section of the glass plate reduces, resulting in decreasing both outer appearance and quality of end product. Also, while the plate is separated, small fragments may be generated.

In cases where the glass plate is cut at an equal rate to solve the above problems, the sizes and numbers of the hackle marks formed on the section of the plate may decrease according to output conditions of the laser, however, the hackle marks cannot be completely removed.

Korean Patent Application No. 10-2002-65542, filed by the present inventors to overcome the above problems, suffers from insufficient cutting conditions of the glass plate.

DISCLOSURE OF THE INVENTION

Leading to the present invention, the intensive and thorough research on optimal conditions of a scribing process and a breaking process upon cutting a non-metallic plate, carried out by the present inventors aiming to avoid the problems encountered in the related art, resulted in the finding that a non-metallic plate can be stably cut under specific scribing and breaking conditions provided by the present invention.

Therefore, it is an object of the present invention to provide a glass plate cutting machine by use of a laser beam, which is advantageous in terms of superior quality of a cut section of the glass plate.

To achieve the above object of the present invention, there is provided a glass plate cutting machine to generate a scribe line on the glass plate and then break the plate, comprising a cracking unit to provide a micro-crack at a cutting initiation point of a glass plate; an irradiation unit to irradiate at least one laser beam, which is absorbed in the glass plate, to the glass plate to heat the glass plate, and including a first carbon dioxide laser beam irradiation part; a cooling unit to cool the glass plate by use of a cooling fluid after irradiation of the at least one laser beam, and including a first cooling part; and a breaking unit to break the glass plate, wherein the first carbon dioxide laser beam irradiation part and the first cooling part disposed at the rear of the first carbon dioxide laser beam irradiation part are used to generate the scribe line while a plane irradiation density is controlled in a range of 0.05-2 joule/mm$^2$ on an irradiation area of 20-200 mm$^2$ by a first control part.

Further, the glass plate cutting machine of the present invention is characterized in that the breaking unit comprises a second carbon dioxide laser beam irradiation part, and thus is used to break the glass plate while a volume irradiation density is controlled in the range of 0.1-0.5 joule/mm$^3$ on the irradiation area of 20-200 mm$^2$ by a second control part.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 1:
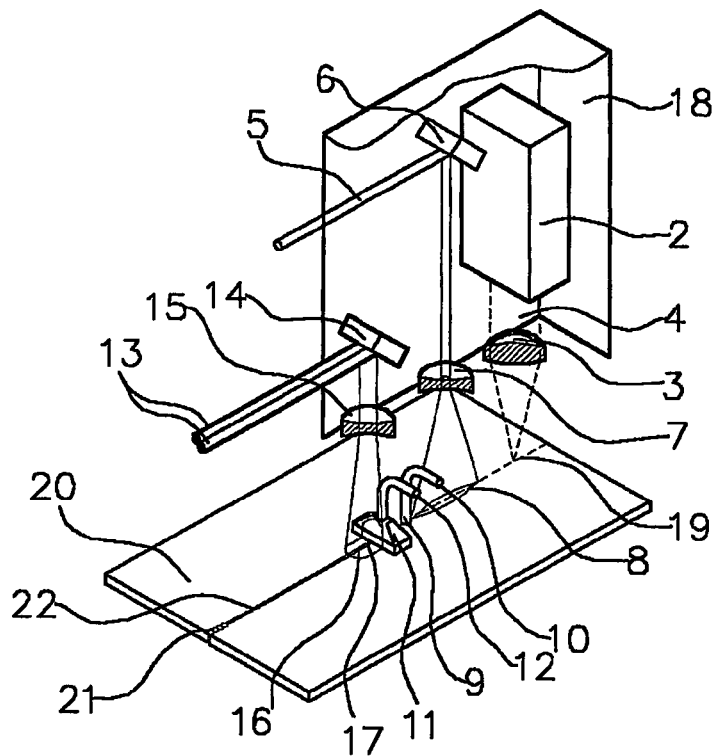
FIG. 1 is a schematic perspective view of a glass plate cutting machine, according to a first embodiment of the present invention.

Based on the present invention, a glass plate cutting machine is provided, including a cracking unit, an irradiation unit, a cooling unit, and a breaking unit.

The cracking unit, which is used to provide a micro-crack at a cutting initiation point of the glass plate, is exemplified by a notching cracker made of an ultra-hard material, such as diamond, quartz, hardened glass, etc., or a known means acting to collect a pulse laser of Nd:YV04 by a light collector and then irradiate the collected laser. As such, the micro-crack has a length of 0.5 to 5 mm.

With the aim of generating a scribe line on the glass plate, the irradiation unit includes a first carbon dioxide laser beam irradiation part, which uses a carbon dioxide laser beam as a first laser beam, and the cooling unit employs a fluid that includes air pressurized water, or water, as well as a conventional cold nitrogen gas.

Further, the water used comprises preferably pure water because a semiconductor, such as TFT of a liquid crystal display panel, should have no impurities.

When cooling water remains on the glass plate, it may be removed by use of an additional vacuum suction machine.

The irradiation by the first carbon dioxide laser beam is performed in a long oval shape along an expected cutting line of the glass plate, instead of the irradiation in a spot shape. As for the oval shaped irradiation, a specific intensity is irradiated according to unit time and unit area of the oval, thereby obtaining a smooth, deep and normal scribe line.

In the present invention, the first carbon dioxide laser beam is irradiated so that a plane irradiation density is controlled in the range of 0.05-2 joule/mm$^2$ on an area of 20-200 mm$^2$. If the plane irradiation density is less than 0.05 joule/mm$^2$, the scribe line is not generated due to the shortage of energy. Although the large irradiation amount results in a deep scribe line, if the plane irradiation density exceeds 2 joule/mm$^2$, the scribe line has a zigzagged pattern, which negatively affects the following breaking process.

Thus, the plane irradiation density is preferably in the range of 0.1-1 joule/mm$^2$, to generate a more stable scribe line.

As such, the laser beam irradiation amount (K) necessary for the generation of the scribe line is calculated according to the following Equation 1:

$$K = P \times \epsilon \times L \div v \qquad \text{Equation 1}$$

Wherein
P: output of a laser oscillator (watt),
$\epsilon$: output rate of the laser oscillator, and
v: transfer rate of the irradiation unit (mm/sec).

In addition, the plane irradiation density ($\Phi$) is calculated according to the following Equation 2:

$$\Phi = P \times \epsilon \times L \div (v \times A) \qquad \text{Equation 2}$$

Wherein
P: output of the laser oscillator (watt),
$\epsilon$: output rate of the laser oscillator,
L: transfer length of the irradiation unit (mm),
v: transfer rate of the irradiation unit (mm/sec), and
A: irradiation area (mm$^2$).

The unit of the irradiation amount is the joule, and the plane irradiation density is represented by the unit of joule/mm$^2$.

That is, the glass plate is preferably cut by irradiating the laser beam in an expanded oval shape on a predetermined irradiation area of the glass plate, instead of irradiating the laser beam in a spot shape as in a heat-cutting process, so that the expected cutting line of the glass plate is in temperatures lower than a melting point. Hence, it is preferred that the laser beam from the oscillator is combined by use of one or more lenses, thus forming the laser beam into the oval shape.

In the present invention, the breaking unit, disposed at the rear of the cooling unit, includes a second carbon dioxide laser beam irradiation part and is used to perform a breaking process while a volume irradiation density is controlled in the range of 0.05-0.5 joule/mm$^3$ on the irradiation area of 20-200 mm$^2$ by a second control part, thus completely severing a target glass plate.

In this case, the laser irradiation intensity of the breaking process should be an energy quantity considering the volume of the glass plate, since it is used to cut the entire glass plate.

Hence, the volume irradiation density ($\delta$) is calculated according to the following Equation 3:

$$\delta = P \times \epsilon \times L \div (v \times A \times t) \qquad \text{Equation 3}$$

Wherein
P: output of the laser oscillator (watt),
$\epsilon$: output rate of the laser oscillator,
L: transfer length of the irradiation unit (mm),
v: transfer rate of the irradiation unit (mm/sec),
A: irradiation area (mm$^2$), and
t: thickness of the glass plate (mm).

The unit of the volume irradiation density is joule/mm$^3$.

If the volume irradiation density is less than 0.05 joule/mm$^3$, the scribe line of the glass plate may be normally generated. However, the glass plate cannot be cut due to the shortage of energy. Meanwhile, if the volume irradiation density exceeds 0.5 joule/mm$^3$, the scribe line may be normally generated, however, a ratio section of the glass plate becomes uneven or the cut ridge is sharply zigzagged, which may cut the user. Further, the glass plate may be split while being largely deviated from the expected cutting line thereof.

Preferably, the control of the volume irradiation density in the range of 0.1-0.3 joule/mm$^3$ results in a stable breaking process.

Further, when the irradiation area by the first laser beam is less than 20 mm$^2$, temperature distributions of the surface and inside of the glass plate are inconsistent so that energy required for the scribing process is focused on a narrow area of the glass plate. Consequently, the scribe line is not smooth but a fine zigzag, and the scribe section becomes very uneven, such as shell.

Such a zigzagged scribe line of the glass plate acts to irregularly split the glass plate through the following breaking process.

On the other hand, when the laser beam irradiation area exceeds 200 mm$^2$, the large area of the glass plate is heated and thus the scribe line is formed to be zigzag.

Therefore, it is preferable that the first laser beam is irradiated in the long oval shape centering on the expected cutting line of the glass plate.

Also, the second laser beam irradiation area of the breaking process less than 20 mm$^2$ results in asymmetrical temperature distributions at both sides of the scribe section, thus generating an uneven scribe section. Whereas, if the irradiation area exceeds 200 mm$^2$, the glass plate is irregularly split.

To control the laser irradiation amount at the scribing process and the breaking process, at least one of three parameters, including the transfer rate, and the irradiation area, as well as the output rate of the laser oscillator, should be adjusted.

Particularly, although the uneven section, referred to as a hackle mark of a ratio section, may be generated at the cutting initiation portion of the glass plate, it is not practically problematic. However, to avoid such a phenomenon, a laser transfer rate is initially slow and then speeds up, or the transfer rate increases in a stepped manner.

When the laser beam begins to irradiate the glass plate, it cannot be wholly absorbed to an end of the glass plate which is exposed to an air layer, different from the inside of the glass plate. This is because some of the light of the laser beam is converted to heat due to the refraction near the end of the glass plate. Therefore, upon the initial cutting of the glass plate, the transfer rate of the laser decreases.

Further, as for the heat transfer, heat generated by the laser beam is transferred to not only the inside of the non-metallic plate but also the air. Thus, the cutting conditions upon the initial cutting of the non-metallic plate, such as the glass plate, become different from those after the initial cutting thereof.

Thus, the non-metallic plate should stand by for the period required to absorb the heat radiated by the laser upon the initial cutting, so as to have the cutting conditions similar to those after the initial cutting thereof.

However, when only the transfer rate decreases with no change of the output condition of the laser upon the initial cutting of the non-metallic plate, heat capacity of the non-metallic plate per unit time increases. As for the results, the non-metallic plate is melted, or may be subjected to scorching, which splits in a vertical direction with respect to the expected cutting line of the plate, or peeling of the surface of the non-metallic plate.

Hence, the transfer rate as well as the output of the laser should decrease upon the initial cutting of the glass plate.

In cases where the glass plate is entirely cut under the conditions of the decreased transfer rate and output of the laser, productivity becomes inferior. Also, if the decreased transfer rate and the output of the laser are maintained even after the initial cutting, the resultant cut section has lower quality, compared to sections cut under optimal conditions after the initial cutting.

The reason is that heat transfer conditions and absorption conditions of the laser beam upon the initial cutting of the glass plate are different from those after the initial cutting.

Thus, after the initial cutting, the transfer rate and the output of the laser decreased at the initial cutting should increase to the original optimal conditions.

As such, the change of the transfer rate should accord to that of the laser output. Otherwise, a mutual relationship between the transfer rate and the laser output is broken, and thus the non-metallic plate is melted or is not cut at all.

Therefore, there is further required a synchronizing process to adjust the laser output according to the change of the transfer rate.

As alternatives for less generating the hackle mark with no change of the transfer rate, when the glass plate is separated along the cutting line thereof, the volume irradiation density increases in the range of the present invention. After such a breaking process becomes stable, the volume irradiation density may decrease in a continuous manner or one or more stepped manner.

In addition, where the hackle mark is less generated by changing the transfer rate or the output rate, the volume irradiation density of the breaking unit decreases to 10-60% at an area between the initiation point to the point of 10-150 mm by the second control part upon an initial cutting. In particular, when the irradiation intensity of the breaking unit decreases to 10-60% upon the initial cutting, the second control part acts to control the irradiation intensity of the initial cutting and after the initial cutting in a continuous curvilinear manner or two or more stepped manner.

Meanwhile, the laser beam oscillator used in the present invention is exemplified by a continuous beam type oscillator or a pulse type oscillator, which is employed to the scribing process and the breaking process. Particularly, the continuous beam type oscillator is preferable, in view of a low heat impact.

As for the irradiation and transfer of the laser beam to the glass plate, the glass plate may be fixed and the laser beam may be irradiated while being transferred. Alternatively, the laser beam is fixed and the glass plate is mounted to an XY table, after which the table may be transferred.

Two large glass plates, used for liquid crystal display panels or plasma displays, are adhered with a predetermined gap therebetween, and then cut into respective cell plates. In this case, the adhered plates may be cut in such a way that any one of the two plates is first cut, the two plates are reversed and then the other plate is cut by the laser beam, or any one of the plates is first cut and then the other plate is cut by the laser beam while remaining the two plates in the position.

Hereinafter, a detailed description will be given of the present invention, with reference to the appended drawings.

Figure 2:
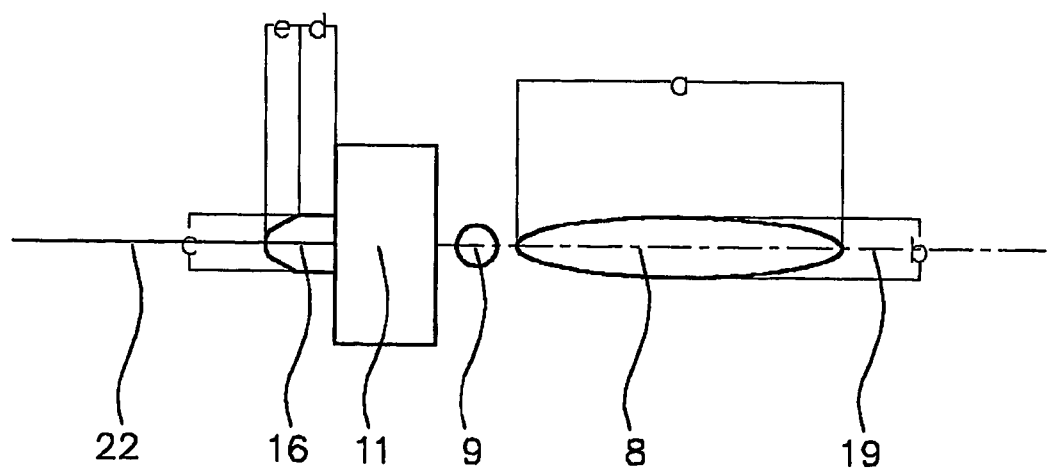
FIG. 2 is a view showing a working state obtained by using the cutting machine of FIG. 1.
Figure 3:
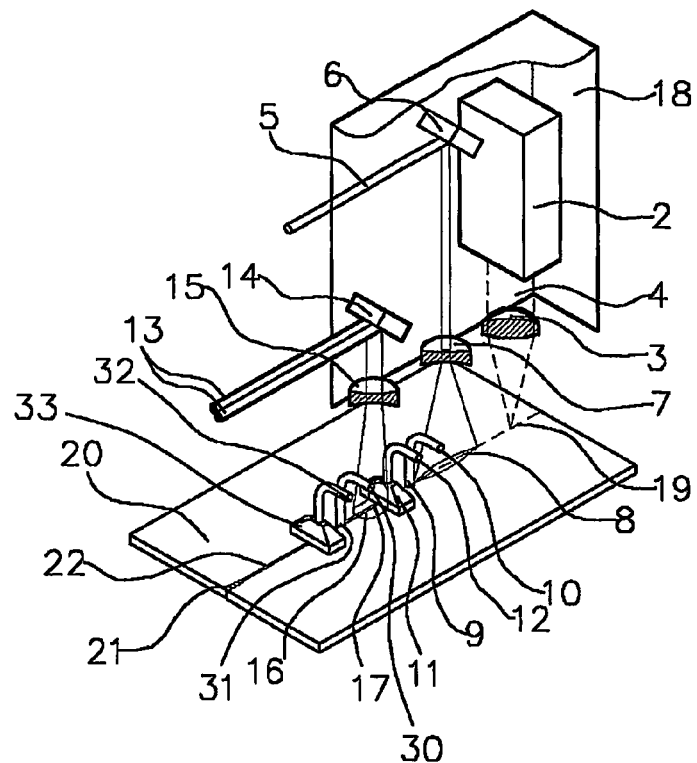
FIG. 3 is a schematic perspective view of a glass plate cutting machine, according to a second embodiment of the present invention.
Figure 4:
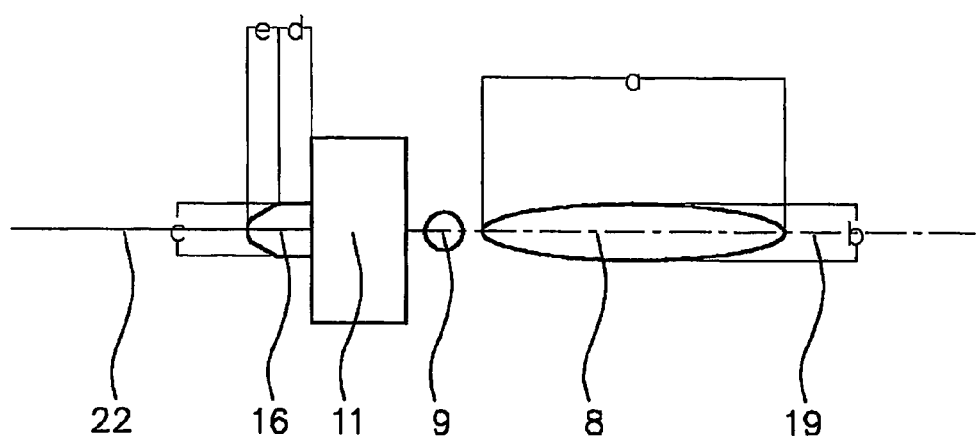
FIG. 4 is a view showing a working state obtained by using the cutting machine of FIG. 3.

FIG. 1 schematically shows the glass plate cutting machine, according to a first embodiment of the present invention, and FIG. 2 shows a working state on the glass plate by use of the cutting machine of FIG. 1. In addition, FIG. 3 schematically shows the glass plate cutting machine, according to a second embodiment of the present invention, and FIG. 4 shows a working state on the glass plate by use of the cutting machine of FIG. 3.

As for the cutting machine, the cracking unit includes a notching cracker made of an ultra-hard material, such as diamond, a file, and quartz glass. Further, the cracker uses a known method comprising the collection of high energy beams of a carbon dioxide laser or YAG pulse laser, which are absorbed into target materials, by a lens, and the irradiation of a focal point of the collected laser. The micro-cracks by the cracker are 0.5-5 mm long.

In the present invention, Nd:YV04 pulse laser is used, and an oscillator 2 and a lens 3 are provided.

A laser beam produced from the oscillator 2 is collected by the lens 3 and then irradiated to a target material, to obtain a notched portion 21.

The irradiation unit utilizes a first carbon dioxide laser beam, and irradiates the laser beam to the glass plate to heat the glass plate, and the irradiated laser beam is oval shaped.

As the first cooling part, a first quencher to generate cracks by quenching the portion heated by, the carbon dioxide laser is provided. A first suction machine 11 is provided at the direct rear of the quencher.

A quencher material, acting to cool the heated portion by the laser beam, is a fluid, and is exemplified by air pressurized water, or water, as well as a conventional cold nitrogen gas.

The quencher material is fed into a quencher material inlet 10 and discharged from a quencher material outlet 9, thereby cooling the target material.

In cases where the quencher material remains on the non-metallic plate, it is removed by use of the suction machine so as not to harm the following process.

The first suction machine 11 includes a suction inlet and a suction pipe 12.

The laser beam is controlled to have a specific irradiation intensity, according to unit time and unit area of the oval, thereby producing a smooth and deep scribe line.

An optical heating appliance, as the irradiation unit, includes an output controller (not shown) which functions to control the output of the laser beam by external pressure.

The breaking unit uses a second carbon dioxide laser, in which the irradiated laser beam is shaped in a circle, a semicircle or a tube to focus the heat capacity.

The structure of the second carbon dioxide laser is substantially similar to that of the first carbon dioxide laser.

The breaking unit may further include a second quencher to quench the heated portion by the optical heating appliance.

As shown in FIGS. 1 and 2, there is shown the breaking unit having only the optical heating appliance, according to the first embodiment of the present invention. Also, as in FIGS. 3 and 4, there is shown the breaking unit having the optical heating appliance and the second quencher, according to the second embodiment of the present invention.

When the glass plate is cut by use of the breaking unit further including the second quencher, the cut section becomes smoother and a cutting efficiency can further increase. Additionally, the cut section is prevented from melting, thus decreasing a dimension error.

A transfer machine (not shown) is connected to a transfer controller to control a transfer rate, and thus it is possible to transfer the machine at a desired transfer rate.

In addition, the machine includes a synchronizing unit to synchronize the transfer rate and the output of the laser beam, whereby the target material is controlled in heat capacity even though the transfer rate is changed.

Having generally described this invention, a further understanding can be obtained by reference to specific examples and comparative examples which are provided herein for purposes of illustration only and are not intended to be limiting unless otherwise specified.

EXAMPLE 1

A transfer rate of a laser head was set to 250 mm/sec.

A fourth high frequency (266 μm, 10 kHz, 1.8 W) from an Nd:YV04 laser oscillator of Coherent Co. was collected by a convex lens and a focal point thereof was irradiated to an initiation end of an expected cutting line of a glass plate to the size of about 0.3 mm, to obtain the initial cracks.

A first carbon dioxide laser beam was irradiated while a pulse width of a pulse oscillator having an average output of 250 W of 10 kHz was controlled to 40% of a distance between centers of the pulse (hereinafter, referred to as 'operation condition', maximal 60%).

An irradiation area 141.6 mm$^2$ of an oval shown in FIG. 3 was calculated by measuring 'a' as a long diameter and 'b' as a short diameter.

Then, water was pressurized under an air pressure of 3 kg/cm$^2$ and sprayed in a haze state, to generate a scribe line.

A plane irradiation density in the oval was calculated to 0.386 joule/mm$^2$, and the scribe line was 170 μm deep. As for the results observed by use of a microscope, the scribe section was clean without unevenness and regarded to be superior.

EXAMPLE 2

The present example was performed in the same manner as in Example 1, with the exception that the operation condition and the irradiation area of the first carbon dioxide laser beam were decreased to 13% and 59.2 mm$^2$, respectively. As for the results, a scribe line with no problems was generated.

EXAMPLE 3

The present example was performed in the same manner as in Example 1, with the exception that the operation condition and the irradiation area were increased to 52% and 162.9 mm$^2$, respectively, and the plane irradiation density was maintained at 0.442 joule/mm$^2$. As for the results, a scribe line with no problems was generated.

EXAMPLE 4

The present example was performed in the same manner as in Example 1, with the exception that the transfer rate was decreased to 100 mm/sec while the operation condition was changed to 20%, and the short diameter of the irradiated oval was decreased, and thus the plane irradiation density was increased to 0.758 joule/mm$^2$. Further, a coolant was changed to pure water. As for the results, a scribe line was 200 μm deep, which was regarded to be good. From this, it can be found that the use of pure water as the coolant leads to the scribe line having increased depth.

EXAMPLE 5

The present example was performed in the same manner as in Example 4, with the exception that the transfer rate and the operation condition were increased to 300 mm/sec and 40%, respectively, and the plane irradiation density was maintained at 0.393 joule/mm$^2$. As for the results, a scribe line with no problems was generated.

EXAMPLE 6

The present example was performed in the same manner as in Example 5, with the exception that the operation condition was decreased to 32%, and the plane irradiation density was maintained at 0.226 joule/mm$^2$. As for the results, a scribe line with no problems was generated.

EXAMPLE 7

The present example was performed in the same manner as in Example 5, with the exception that the transfer rate was further increased to 450 mm/sec, and the operation condition was decreased to 26%, and the plane irradiation density was to be 0.18 joule/mm$^2$. As for the results, a scribe line with no problems was generated.

COMPARATIVE EXAMPLE 1

The present example was performed in the same manner as in Example 5, with the exception that the transfer rate was further increased to 750 mm/sec, and the operation condition was decreased to 26%, and the plane irradiation density was to be 0.041 joule/mm$^2$. As for the results, no scribe line was generated.

That is, if the plane irradiation density is less than 0.05 joule/mm$^2$, it can be found that the glass plate cannot be cut.

EXAMPLE 8

The present example was performed in the same manner as in Example 1, with the exception that the oscillator of the first carbon dioxide laser was changed to a continuous beam type 240 W carbon dioxide laser oscillator to generate a scribe line.

As for the continuous oscillator, an output rate was controlled by an output control function of the oscillator, and the mirror and lens system of the continuous oscillator was the same to those of the pulse oscillator. Thus, the irradiated shape was oval, and the irradiated area was 68.1 mm$^2$, with the plane irradiation density of 0.496 joule/mm$^2$.

Then, the glass plate was mechanically cut by manpower, and the scribe section was observed. As for the results, a superior scribe line having a depth of 170 μm was generated, with no problems.

EXAMPLE 9

The present example was performed in the same manner as in Example 8, with the exception that the transfer rate was decreased and the output rate was increased, and the coolant was changed to water, and the plane irradiation density was changed to 1.747 joule/mm$^2$ to increase the depth of the scribe line. As for the results, a scribe line having the depth of 190 μm was generated.

Further, the scribe line was rectilinear shaped, which had no practical problems, however, a large wave shape indicating the limit shape was generated on the scribe section. Thus, it can be found that the energy density is preferably in the range of 2 joule/mm$^2$ or less.

EXAMPLE 10

The present example was performed in the same manner as in Example 8, with the exception that the output rate was increased, and the plane irradiation density was to be 0.993 joule/mm$^2$ to increase the depth of the scribe line. As for the results, a superior scribe line having the depth of 190 μm was generated.

EXAMPLE 11

A normal scribe line was generated under the conditions of Example 6, after which a second carbon dioxide laser beam was irradiated at 300 mm/sec to cut a liquid crystal display panel having glass plates adhered by a predetermined gap, each glass plate having a thickness of 0.7 mm.

A laser beam from 500 W pulse type carbon dioxide laser oscillator having two oscillating sources was irradiated in a pentagonal shape with a trailing edge while controlling the operation condition to 36%.

The area (79.8 mm$^2$) was obtained by measuring the portions of c, d and e shown in FIG. 2 and approximately calculating the irradiation area of the laser beam to the sum of the square and triangle.

Since the glass plate was cut in a thickness direction, the irradiation energy was 0.125 joule/mm$^3$ as a volume irradiation density calculated per unit volume of the glass. As for the results, although an uneven cut section referred to as a hackle mark from an initiation end of the glass plate to the point of 50 mm was shown, it was not practically problematic. A smooth cut section was shown after the point of 50 mm.

EXAMPLE 12

The present example was performed in the same manner as in Example 11, with the exception that the operation condition of the second laser beam was decreased to 28%. As for the results, the hackle mark was shown to the initial cut portion, however, the other section had no practical problems.

EXAMPLE 13

The present example was performed in the same manner as in Example 11, with the exception that the transfer rate was decreased to 150 mm/sec., and the operation condition was decreased to 23%. As for the results, there were no initial hackle mark and no problems after the initial cut portion, because the volume irradiation density was increased by about 10%, as 0.133 joule/mm$^3$.

EXAMPLE 14

To confirm the results of Example 13 with a high-speed transfer, the transfer rate was to be 300 mm/sec, and the operation condition was changed to 50%, and the volume irradiation density was to be 0.158 joule/mm$^3$. No problems were recorded.

EXAMPLE 15

The present example was performed in the same manner as in Example 14, with the exception that the liquid crystal display panel made of 1.2 mm thick glass plates was used, instead of 0.7 mm thick glass plate, and the irradiation area was decreased to 59.6 mm$^2$, and the volume irradiation density was to be 0.14 joule/mm$^3$. No problems were recorded.

EXAMPLE 16

The present example was performed in the same manner as in Example 15, with the exception that a 3 mm thick single glass plate was used, and the irradiation area was changed to 50.3 mm$^2$, and the transfer rate was decreased to 100 mm/sec, and the operation condition was changed to 60%, and the volume irradiation density was increased to 0.196 joule/mm$^3$. As for the results, although a cut section having large wave shape was generated, it had no practical problems.

If the irradiation area is considerably decreased, it is difficult to transfer and irradiate the laser while being positioned at a center of the scribe line. It is preferable that the irradiation area is a circle having a diameter of 5 mm, that is, 20 mm$^2$ or more.

EXAMPLE 17

The present example was performed in the same manner as in Example 11, with the exception that the irradiation area was increased to 115 mm$^2$. The results were not changed.

EXAMPLE 18

The present example was performed in the same manner as in Example 17, with the exception that the irradiation area was further increased to 331.5 mm$^2$. The results were similar to those of Example 11.

COMPARATIVE EXAMPLE 2

The present example was performed in the same manner as in Example 11, with the exception that the operation condition was changed to 60%, and the transfer rate and the irradiation area were decreased to 100 mm/sec and 56 mm$^2$, respectively, and the volume irradiation density was increased to 0.638 joule/mm$^3$. As for the results, the cut line was largely deviated from an expected cutting line of the glass plate.

COMPARATIVE EXAMPLE 3

The present example was performed in the same manner as in Example 11, with the exception that the operation condition was increased to 60%, and the irradiation area was increased to 450 mm², and the volume irradiation density was decreased to 0.079 joule/mm³. As for the results, a glass plate was not cut by the shortage of energy.

EXAMPLE 19

The present example was performed in the same manner as in Example 11, with the exception that a continuous beam type 240 W carbon dioxide laser oscillator was used to irradiate the second carbon dioxide laser, instead of the pulse type laser oscillator, and the beam from the B lens was irradiated to a circular shape. As for the results, a liquid crystal display panel made of 0.7 mm thick glass plates was cut.

An output rate was 40%, which was similar to that of Example 11.

EXAMPLE 20

The present example was performed in the same manner as in Example 19, with the exception that the output rate was increased to 100%. As for the results, there were no hackle marks, and a good ratio section was obtained.

COMPARATIVE EXAMPLE 4

The present example was performed in the same manner as in Example 19, with the exception that the output rate was decreased to 20%, and the volume irradiation density was decreased to 0.044 joule/mm³. As for the results, the glass plate was not cut at all.

That is, if the volume irradiation density is less than 0.5 joule/mm³, it can be found that the glass plate is not cut by the shortage of energy.

When the laser transfer rate of the scribing process of Examples 1 to 10 accords to that of the breaking process of Examples 11 to 20, all units, including the initial cracking unit, the first carbon dioxide laser irradiation part of the irradiation unit, the cooling unit, and the second carbon dioxide laser irradiation part of the breaking unit, can be received into a laser head, as shown in FIG. 1.

The results of the above examples and comparative examples are summarized in the following Tables 1 to 4.

TABLE 1

| | Scribing Process: Pulse Type 250W Oscillator (100pulse/sec, Operation Condition Max. 60%) | | | | | | | | | | | |
|---|---|---|---|---|---|---|---|---|---|---|---|---|
| Ex. No. | Operation Condition % | Output W | Transfer Rate mm/s | Irradiation joule | a mm | b mm | Plane Irradiation Area mm² | Irradiation Density joule/mm² | Scribe Depth μm | Cooling Fluid | Scribe Quality | Note |
| 1 | 40 | 167 | 250 | 55 | 82 | 2.2 | 141.6 | 0.386 | 170 | Air/Water | ◉ | |
| 2 | 13 | 54 | 250 | 13 | 58 | 1.3 | 59.2 | 0.212 | 124 | Air/Water | ◉ | |
| 3 | 52 | 217 | 250 | 72 | 83 | 2.5 | 162.9 | 0.442 | 165 | Air/Water | ◉ | |
| 4 | 20 | 83 | 100 | 71 | 85 | 1.4 | 93.4 | 0.758 | 200 | Water | ◉ | |
| 5 | 40 | 167 | 300 | 46 | 82 | 1.8 | 115.9 | 0.393 | 180 | Water | ◉ | |
| 6 | 32 | 133 | 300 | 38 | 85 | 2.5 | 166.8 | 0.226 | 160 | Water | ◉ | |
| 7 | 26 | 108 | 450 | 20 | 84 | 1.7 | 112.1 | 0.180 | 120 | Water | ◉ | |
| C.1 | 15 | 63 | 750 | 7 | 87 | 2.6 | 177.6 | 0.041 | 0 | Water | — | No |

◉: very good,
○: good,
x: bad

TABLE 2

| | Scribing Process: Continuous Beam Type 240W Oscillator | | | | | | | | | | | |
|---|---|---|---|---|---|---|---|---|---|---|---|---|
| Ex. No. | Operation Condition % | Output W | Transfer Rate mm/s | Irradiation joule | a mm | b mm | Plane Irradiation Area mm² | Irradiation Density joule/mm² | Scribe Depth μm | Cooling Fluid | Scribe Quality | Note |
| 8 | 50 | 120 | 220 | 34 | 62 | 1.4 | 68.1 | 0.496 | 170 | Air/water | ◉ | |
| 9 | 80 | 192 | 100 | 119 | 62 | 1.4 | 68.1 | 1.747 | 190 | Water | ○ | Large wave |
| 10 | 100 | 240 | 220 | 68 | 62 | 1.4 | 68.1 | 0.993 | 130 | Water | ◉ | |

TABLE 3

Breaking Process: Pulse Type 250W Oscillator (100pulse/sec, Operation Condition Max. 60%)

| Ex. No. | Operation Condition % | Output W | Transfer Rate mm/s | Irradiation joule | c mm | d mm | e mm | Irradiation Area $mm^2$ | Glass Thick. mm | Volume Irradiation Density joule/$mm^3$ | Section Quality | Note |
|---|---|---|---|---|---|---|---|---|---|---|---|---|
| 11 | 36 | 300 | 250 | 7.0 | 8.1 | 8.1 | 11.6 | 79.8 | 0.7 | 0.125 | ○ | Ini. Hackle |
| 12 | 28 | 233 | 250 | 5.5 | 7.1 | 8 | 11.7 | 70.3 | 0.7 | 0.111 | ○ | Ini. Hackle |
| 13 | 23 | 192 | 150 | 7.4 | 8.1 | 8 | 11.6 | 79.8 | 0.7 | 0.133 | ◎ | |
| 14 | 50 | 417 | 300 | 8.1 | 7.4 | 8.1 | 11.7 | 73.3 | 0.7 | 0.158 | ◎ | |
| 15 | 60 | 500 | 300 | 10.0 | 5.9 | 8 | 12 | 59.6 | 1.2 | 0.140 | ◎ | |
| 16 | 60 | 500 | 100 | 29.5 | 5 | 8 | 11.8 | 50.3 | 3.0 | 0.196 | ◎ | |
| 17 | 36 | 300 | 250 | 8.4 | 10 | 9 | 14 | 115.0 | 0.7 | 0.104 | ○ | Ini. Hackle |
| 18 | 60 | 500 | 250 | 22.0 | 17 | 17 | 22 | 331.5 | 0.7 | 0.095 | ○ | Ini. Hackle |
| C.2 | 60 | 500 | 100 | 25.0 | 7 | 6 | 10 | 56.0 | 0.7 | 0.638 | x | Scratching |
| C.3 | 60 | 500 | 250 | 25.0 | 20 | 20 | 25 | 450.0 | 0.7 | 0.079 | — | No Cutting |

TABLE 4

Breaking Process: Continuous Beam Type 240W Oscillator

| Ex. No. | Operation Condition % | Output W | Transfer Rate mm/s | Irradiation joule | Beam Dia. mm | Irradiation Area $mm^2$ | Glass Thick. mm | Volume Irradiation Density joule/$mm^3$ | Section Quality | Note |
|---|---|---|---|---|---|---|---|---|---|---|
| 19 | 40 | 96 | 250 | 3.2 | 8.3 | 54.1 | 0.7 | 0.084 | ○ | Ini. Hackle |
| 20 | 100 | 240 | 250 | 8.2 | 8.5 | 56.7 | 0.7 | 0.206 | ◎ | |
| C.4 | 20 | 48 | 250 | 1.5 | 8.0 | 50.2 | 0.7 | 0.044 | — | No Cutting |

INDUSTRIAL APPLICABILITY

As described hereinbefore, the present invention provides a glass plate cutting machine, characterized in that irradiation conditions of first and second laser beams are limited in specific ranges, thereby solving problems, such as a zig-zagged scribe line, uneven cut section, and slanting cutting. Thus, double glass plates adhered for use in liquid crystal display panel or plasma display, as well as a single glass plate, can be stably cut, hence increasing a product ratio of a cutting process (ratio of product to raw material). Further, a thin glass plate having a thickness of 0.5 mm or less for liquid crystal display panel developed recently can be stably cut under the laser irradiation conditions of the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A glass plate cutting machine to generate a scribe line on the glass plate and then break the plate, comprising:
   a cracking unit to provide a micro-crack at a cutting initiation point of a glass plate;
   an irradiation unit to irradiate at least one laser beam, which is absorbed in the glass plate, to the glass plate to heat the glass plate, and including a first carbon dioxide laser beam irradiation part;
   a cooling unit to cool the glass plate by use of a cooling fluid after irradiation of the at least one laser beam, and including a first cooling part disposed at the rear of the first carbon dioxide laser beam irradiation part;
   a breaking unit, including a second carbon dioxide laser beam irradiation part, to break the glass plate, and a second cooling part disposed at the rear of the second carbon dioxide laser beam irradiation part,
   wherein the first carbon dioxide laser beam irradiation part and the first cooling part are used to generate the scribe line while a plane irradiation density is controlled in a range of 0.05-2 joule/$mm^2$ on an irradiation area of 20-200 $mm^2$ by a first control part,
   wherein the breaking unit is used to break the glass plate while a volume irradiation density is controlled in the range of 0.1-0.5 joule/$mm^2$ on the irradiation area of 20-200 $mm^2$ by a second control part.

2. The machine as defined in claim 1, wherein a second control part functions to decrease the volume irradiation density of the breaking unit to 10-60% at an area between the cutting initiation point of the glass plate and a point of 10-150 mm upon an initial cutting.

3. The machine as defined in claim 2, wherein the second control part functions to control irradiation intensity of the initial cutting and after the initial cutting in a nonlinear manner when the irradiation intensity of the breaking unit decreases to 10-60% upon the initial cutting.

4. The machine as defined in claim 1, wherein the plane irradiation density or the volume irradiation density is controlled by adjusting at least one of an output, an irradiation area and a transfer rate of the irradiation unit.

5. The machine as defined in claim 4, further comprising a synchronizing unit acting to change the output of the irradiation unit in proportion to the transfer rate of the irradiation unit, so as to control the output and the transfer rate of the irradiation unit.

6. The machine as defined in claim 1, wherein the cooling fluid of the cooling unit comprises water.

7. The machine as defined in claim 1, further comprising a vacuum suction machine sucking the fluid disposed at the direct rear of the cooling unit.

* * * * *